United States Patent
Shen et al.

(10) Patent No.: US 9,996,768 B2
(45) Date of Patent: Jun. 12, 2018

(54) NEURAL NETWORK PATCH AGGREGATION AND STATISTICS

(71) Applicant: Adobe Systems Incorporated, San Jose, CA (US)

(72) Inventors: Xiaohui Shen, San Jose, CA (US); Xin Lu, State College, PA (US); Zhe Lin, Fremont, CA (US); Radomir Mech, Mountain View, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 691 days.

(21) Appl. No.: 14/548,170

(22) Filed: Nov. 19, 2014

(65) Prior Publication Data

US 2016/0140408 A1 May 19, 2016

(51) Int. Cl.
*G06K 9/00* (2006.01)
*G06K 9/46* (2006.01)

(52) U.S. Cl.
CPC ......... *G06K 9/4676* (2013.01); *G06K 9/4628* (2013.01)

(58) Field of Classification Search
CPC .......................... G06K 9/4628; G06K 9/4676
See application file for complete search history.

(56) References Cited

U.S. PATENT DOCUMENTS

| | | | | |
|---|---|---|---|---|
| 5,822,742 A * | 10/1998 | Alkon | ................... | G06K 9/4628 382/159 |
| 8,818,995 B1 * | 8/2014 | Guha | ................ | G06F 17/30864 707/722 |
| 9,020,263 B2 * | 4/2015 | Dunlop | ............... | G06K 9/00684 382/173 |
| 9,129,190 B1 * | 9/2015 | Ranzato | ............... | G06K 9/6257 |
| 9,224,068 B1 * | 12/2015 | Ranzato | ............... | G06K 9/3241 |
| 9,569,736 B1 * | 2/2017 | Ghesu | ................... | G06N 99/005 |
| 9,613,058 B2 * | 4/2017 | Shen | ................. | G06F 17/30247 |
| 9,613,297 B1 * | 4/2017 | Ranzato | ............... | G06K 9/6255 |
| 9,852,231 B1 * | 12/2017 | Ravi | .................... | G06N 99/005 |
| 2007/0005356 A1 * | 1/2007 | Perronnin | ............ | G06K 9/4676 704/245 |
| 2009/0024607 A1 * | 1/2009 | Sun | ................... | G06F 17/30675 |
| 2012/0045095 A1 * | 2/2012 | Tate | ....................... | G06T 5/003 382/103 |

(Continued)

OTHER PUBLICATIONS

Lu, et al., "Rapid: Rating Pictorial Aesthetics using Deep Learning", ACM Multimedia, 2014., 2014, 10 pages.

*Primary Examiner* — Iman K Kholdebarin
(74) *Attorney, Agent, or Firm* — Wolfe-SBMC

(57) ABSTRACT

Neural network patch aggregation and statistical techniques are described. In one or more implementations, patches are generated from an image, e.g., randomly, and used to train a neural network. An aggregation of outputs of patches processed by the neural network may be used to label an image using an image descriptor, such as to label aesthetics of the image, classify the image, and so on. In another example, the patches may be used by the neural network to calculate statistics describing the patches, such as to describe statistics such as minimum, maximum, median, and average of activations of image characteristics of the individual patches. These statistics may also be used to support a variety of functionality, such as to label the image as described above.

25 Claims, 10 Drawing Sheets

(56) References Cited

U.S. PATENT DOCUMENTS

| | | | |
|---|---|---|---|
| 2014/0270431 A1* | 9/2014 | Xu | G06K 9/00147 382/128 |
| 2015/0049943 A1* | 2/2015 | Hamsici | G06K 9/4609 382/170 |
| 2015/0125049 A1* | 5/2015 | Taigman | G06K 9/00268 382/118 |
| 2016/0188902 A1* | 6/2016 | Jin | G06F 21/6245 726/28 |
| 2016/0224869 A1* | 8/2016 | Clark-Polner | G06K 9/6254 |
| 2016/0232430 A1* | 8/2016 | Andreopoulos | G06K 9/4676 |
| 2016/0307071 A1* | 10/2016 | Perronnin | G06K 9/4628 |

* cited by examiner

US 9,996,768 B2

NEURAL NETWORK PATCH AGGREGATION AND STATISTICS

BACKGROUND

Conventional uses of neural networks are typically limited by an amount of computational resources available for implementation of the neural network. Accordingly, in order to employ a conventional neural network to process an image, the image is downsized in conventional techniques such that the amount of image data to be processed does not overwhelm the available computational resources. Consequently, a large amount of information may be lost in downsizing the image, which could make these conventional neural network processing techniques ill-suited for some image processing operations.

SUMMARY

Neural network patch aggregation and statistical techniques are described. In one or more implementations, patches are generated from an image, e.g., randomly, and used to train a neural network. An aggregation of outputs of patches processed by the neural network may then be used to label an image using an image descriptor, such as to label aesthetics of the image, classify the image, and so on. In another example, the patches may be used by the neural network to calculate statistics describing the patches, such as to describe statistics such as minimum, maximum, median, and average of activations (e.g., amounts) of image characteristics of the individual patches. These statistics may also be used to support a variety of functionality, such as to label the image as described above.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
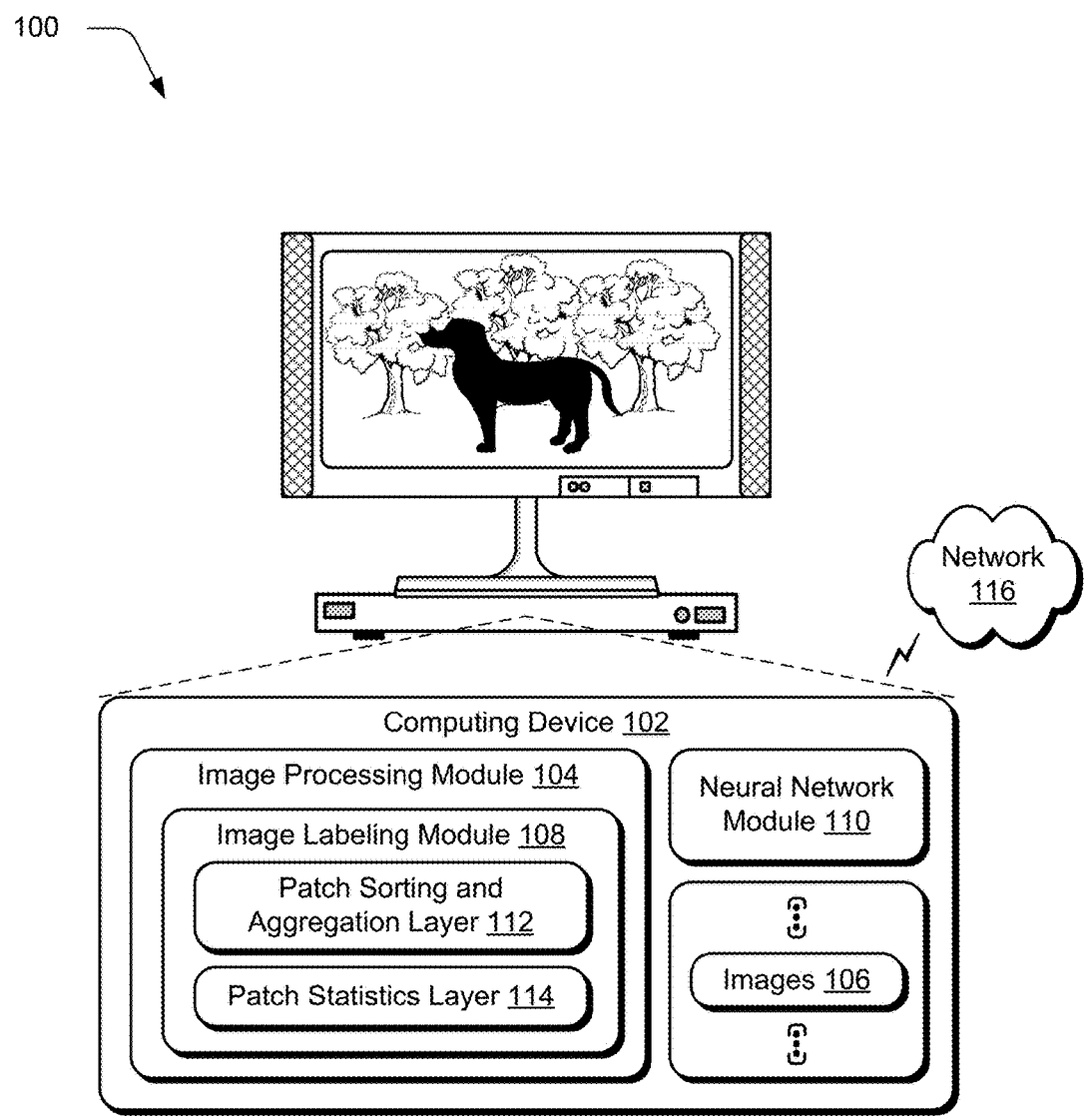
FIG. 1 is an illustration of an environment in an example implementation that is operable to employ neural network techniques described herein.

Neural networks have been employed in a variety of image processing techniques, such as in computer vision problems to perform object recognition, scene recognition, and object detection. However, conventional neural network techniques are limited by availability of computational resources and training duration and as such conventional techniques downsized images before processing, such as to a size of 256 by 256 using three color channels.

This downsizing, however, may result in signification information loss, which may make conventional neural network techniques ill-suited for some image processing operations, such as labeling operations to label image aesthetics, image quality, and image style classification. Although a cropping technique has been developed to obtain information from an original high-resolution version of image, typically the image may not be accurately represented in this single cropped image, such as to universally represent the characteristics of an image sufficiently to perform the labeling.

Patch group aggregation and statistic neural network techniques are described. In one or more implementations, image descriptors are learned from high-resolution images, e.g., 1024×768 by three color channels, 2590×1920 by three color channels, and so forth. For example, a group of patches are randomly sampled from an image (e.g., having a fixed size) and used to train a neural network. In a later layer of the neural network, the outputs of the patches in a group are aggregated to generate an image descriptor that describes a confidence that the image has an image attribute, such as to perform face quality classification, image quality classification, or image aesthetics. A sorting function is applied to the outputs of the patches, which may be used to learn fixed weights to be applied as part of patch aggregation (e.g., to weight a contribution as part of the aggregation) and improve consistency of training and testing.

Similar techniques may be employed involving use of statistics as part of a neural network. For example, a patch statistics selection/aggregation layer may be embedded in a learning process of a neural network. First, an amount of information to be processed may be reduced through the neural network by generating vectors that describe image characteristics using patches. Patch statistics may then be calculated using the vectors as part of an iterative network training framework, where the error generated based on patch statistics contributes to training of the neural network. These techniques may also be employed to generate an image descriptor that describes a confidence that the image has an image attribute, such as to perform face quality classification, image quality classification, or image aesthetics. Further discussion of these and other examples may be found in relation to the following sections.

In the following discussion, an example environment is first described that may employ techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ neural network techniques described herein. The illustrated environment 100 includes a computing device 102, which may be configured in a variety of ways. Computing devices, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, although a single computing device is shown in some instances, computing devices may be representative of a plurality of different devices, such as multiple servers utilized by a business to perform operations "over the cloud", further discussion of which may be found in relation to FIG. 10.

The computing device 102 is illustrated as including an image processing module 104. The image processing module 104 is representative of functionality to process images 106. A variety of different image processing techniques may be employed by the image processing module 104, such as to perform object recognition, scene recognition, object detection, image modification, image attribute identification, and so on.

An example of this functionality is represented as an image labeling module 108. The image labeling module 108 is representative of functionality to label the images 106 using an image descriptor that is indicative of a confidence that the image 106 has an image attribute, which may involve a plurality of image characteristics. For example, image attributes may include face quality classification, image quality classification, or image aesthetics. These attributes may be defined based on one or more image characteristics, such as to determine whether the image 106 is considered to have "good" or "bad" aesthetics using image characteristics such as noise, darkness level, and so on to make that determination.

In order to perform this labeling, a neural network module 110 may be employed. The neural network module 110 is representative of functionality to implement a neural network, which may include a plurality of neural layers such as convolutional and directly connected layers to learn activations (e.g., amounts) of image characteristics, such as an amount of darkness, light, contrast, and so forth. These activations may then be used to label image attributes, such as to learn a confidence that the image has an image attribute. For example, in order to learn whether the image 106 is aesthetically "good" activations of image characteristics such as lighting, noise, whether the image is "upright", and so on may be learned by the neural network module 110.

A variety of functionality may be utilized as part of this labeling, examples of which are illustrated as a patch sorting and aggregation layer 112 and a patch statistics layer 114. The patch sorting and aggregation layer 112 is representative of functionality to learn image descriptors from high-resolution images. For example, patches may be randomly sampled from the image 106 and used to train a neural network of the neural network module 110. The patch sorting and aggregation layer 112 may be employed as a layer of the neural network to aggregate outputs of the patches to generate an image descriptor as described above.

As part of this processing, the patch sorting and aggregation layer 112 may employ a sorting function on outputs of the patches. As patches in the group are randomly sampled from the image 106 in this example, fixed weights cannot be learned in a straightforward manner. Accordingly, a sorting function may be employed by the patch sorting and aggregation layer 112 to learn fixed weights for the outputs of the patches in the group to be employed as part of aggregation of the outputs, which may be used to improve efficiency in training and testing consistency. Further discussion of patch sorting and aggregation techniques may be found in relation to FIGS. 2-5 and 8.

The patch statistics layer 114 is representative of functionality to incorporate a learning process of a neural network of the neural network module 110 with patch statistics. For example, these techniques may utilize patches as described above. In this instance, however, an iterative network training framework is used in which an error generated based on patch statistics contributes to training performed by the neural network. This technique may also be applied to a variety of different labeling operations that may leverage the patch statistics information, such as image aesthetics, image quality, and image style classification. Although use of sorting, aggregation, and statistics layers as part of a neural network to perform labeling of image attributes are described in the following, these techniques are equally applicable for a variety of other uses, such as labeling as part of sound processing, image searches, and so on. In practice, both the sorting and aggregation techniques as well as the statistical techniques have exhibited improvement over conventional techniques, e.g., depending on patch size from five to ten percent increase in accuracy over one thousand test images.

Figure 2:
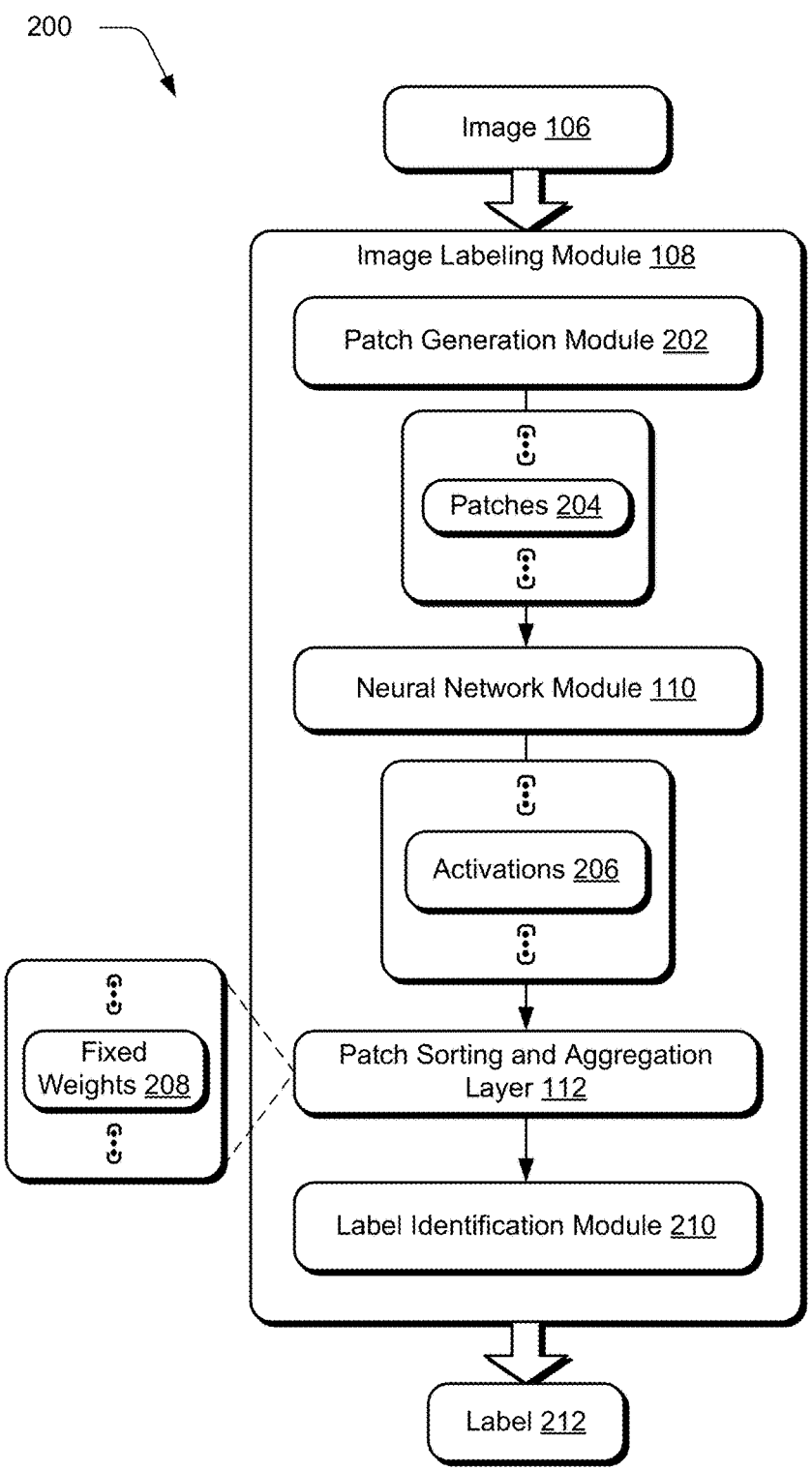
FIG. 2 depicts a system in an example implementation showing interaction of a neural network of a neural network module of FIG. 1 and a patch sorting and aggregation layer to perform labeling.

FIG. 2 depicts a system 200 in an example implementation showing interaction of a neural network of the neural network module 110 and a patch sorting and aggregation layer 112 to perform labeling. The image labeling module 108 receives an image 106. A patch generation module 202 is then utilized to generate a plurality of patches 204 from the image 106. For example, the patches 204 may be randomly sampled from the image having a fixed size, e.g., 128, 196, 256, 320 pixel sizes and so forth, and may be taken from multiple scales. Additionally, these patches 204 may be sampled without down-sampling the image 106 by the patch generation module 202 and thus may be performed without loss of information.

The patches 204 are then used to train a neural network of the neural network module 110. The neural network module 110, for instance, may be configured to calculate activations of image characteristics for each of the patches. As previously described, the image characteristics may describe a variety of different characteristics, such as noise, darkness, contrast, structure, whether an alignment is upright, likelihood of including a part of an object (e.g., face), and so forth.

These activations 206 may be expressed in a variety of ways. For example, for each of the patches 204, a vector having a plurality of dimensions may be generated in which each of the dimensions has a corresponding image characteristic. Thus, the vector may express an amount of each of the respective characteristics through use of the activations using the dimensions of the vector.

A patch sorting and aggregation layer 112 may then be employed to aggregate a response of the neural network module 110. As previously described, as patches 204 are randomly sampled from the image 106, a sorting technique may be utilized to learn fixed weights 208 to be used as part of aggregation, which may make the training and testing performed by the neural network consistent. Aggregation may be performed in a variety of ways, such as to including ranking as further described in relation to FIGS. 4 and 5.

An output of the patch sorting and aggregation layer 112 may then be processed by a label identification module 210 to generate a label 212 for the image 106. The label 212, for instance, may express a confidence that the image 106 has an image attribute, such as "good" or "bad" image aesthetics, face quality, image quality, and so forth. Thus, activations of the image characteristics generated by the neural network for patches may be used to express a confidence of the image as a whole has an image attribute. An example of a neural network is described in the following and is shown in a corresponding figure.

Figure 3:
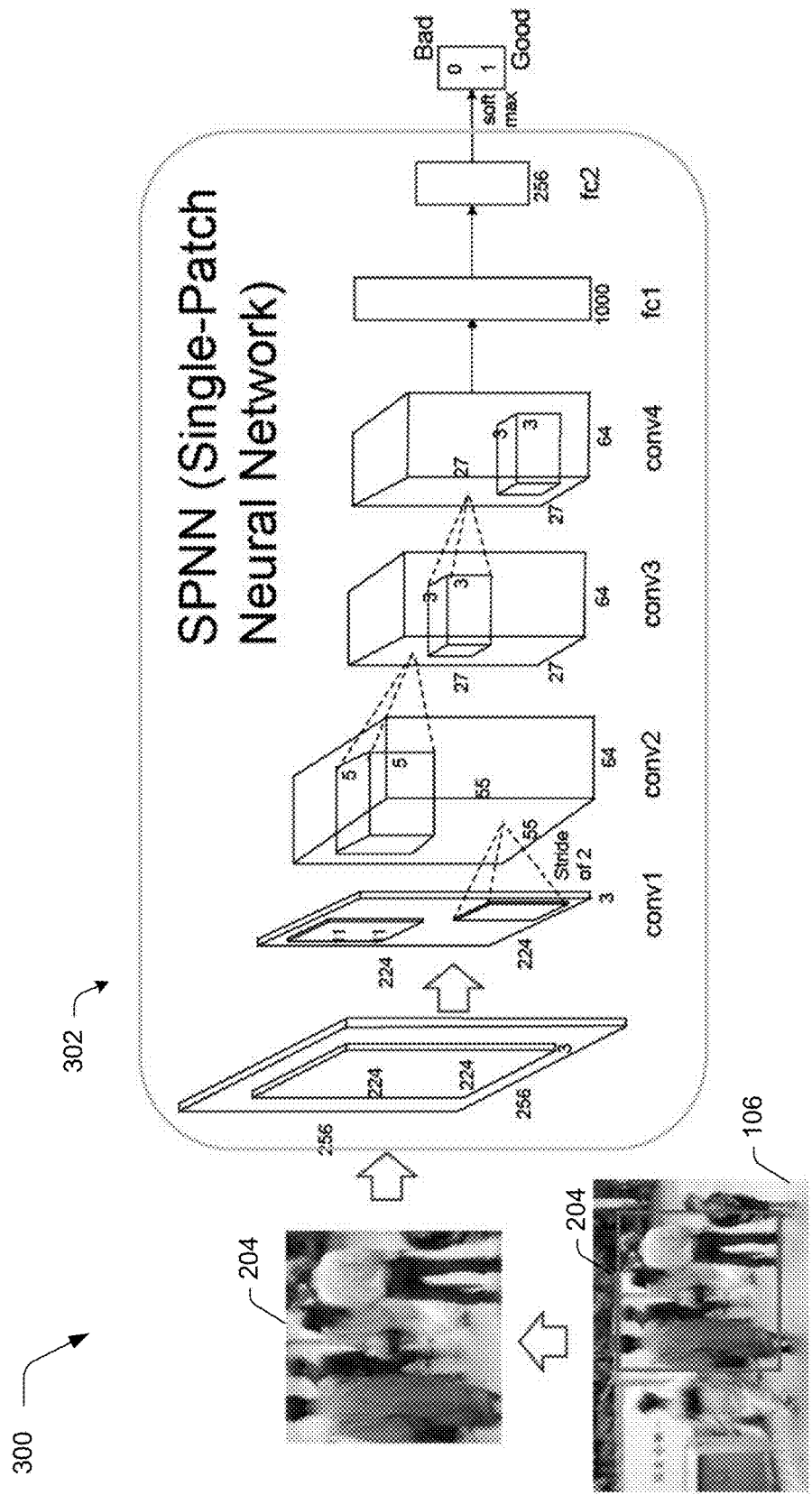
FIG. 3 depicts a system in an example implementation showing a single-patch neural network that may be implemented using the neural network module and patch sorting and aggregation layer of FIGS. 1 and 2 in greater detail.

FIG. 3 depicts a system 300 in an example implementation showing a single-patch neural network 302 that may be implemented using the neural network module 110 and patch sorting and aggregation layer 112 of FIGS. 1 and 2 in greater detail. The single-patch neural network (SPNN) 302 in this example receives a patch 204 taken from an image 106 as previously described.

The SPNN 302 includes seven neural layers of which some are convoluted and some are fully connected. Whenever the patch 204 is passed to the SPNN 302, neurons at various levels analyze that patch 204 and pass it on the next level. At the end of the seventh layer in this example, a vector is generated having a plurality of dimensions, each of which corresponding to an image characteristic, which is a result of response from the neurons at the last level. The SPNN 302 may be leveraged in a variety of ways, examples of which are shown in FIGS. 4 and 5.

Figure 4:
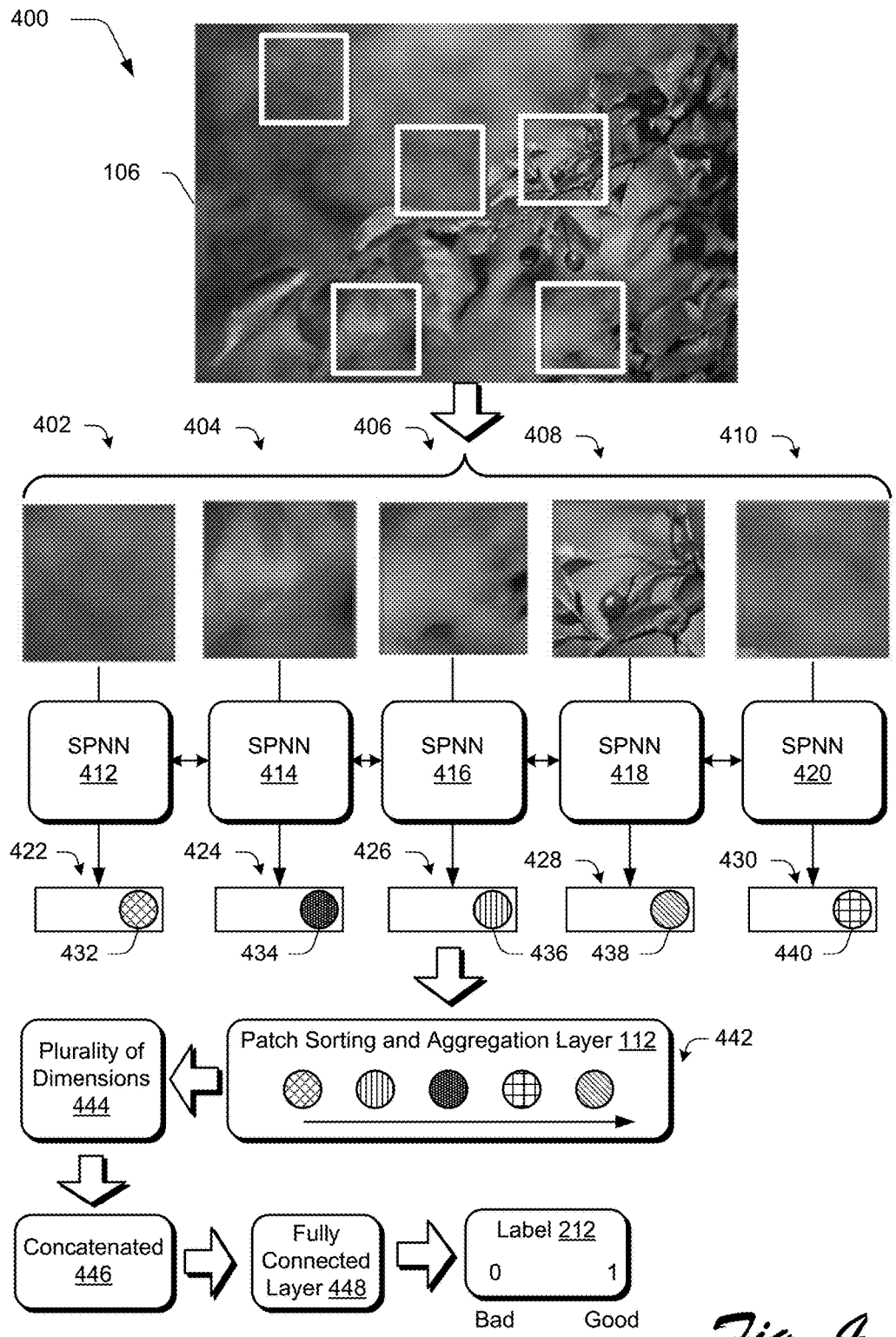
FIG. 4 depicts an example implementation of a patch-group aggregation network that includes the single patch neural network of FIG. 3.
Figure 5:
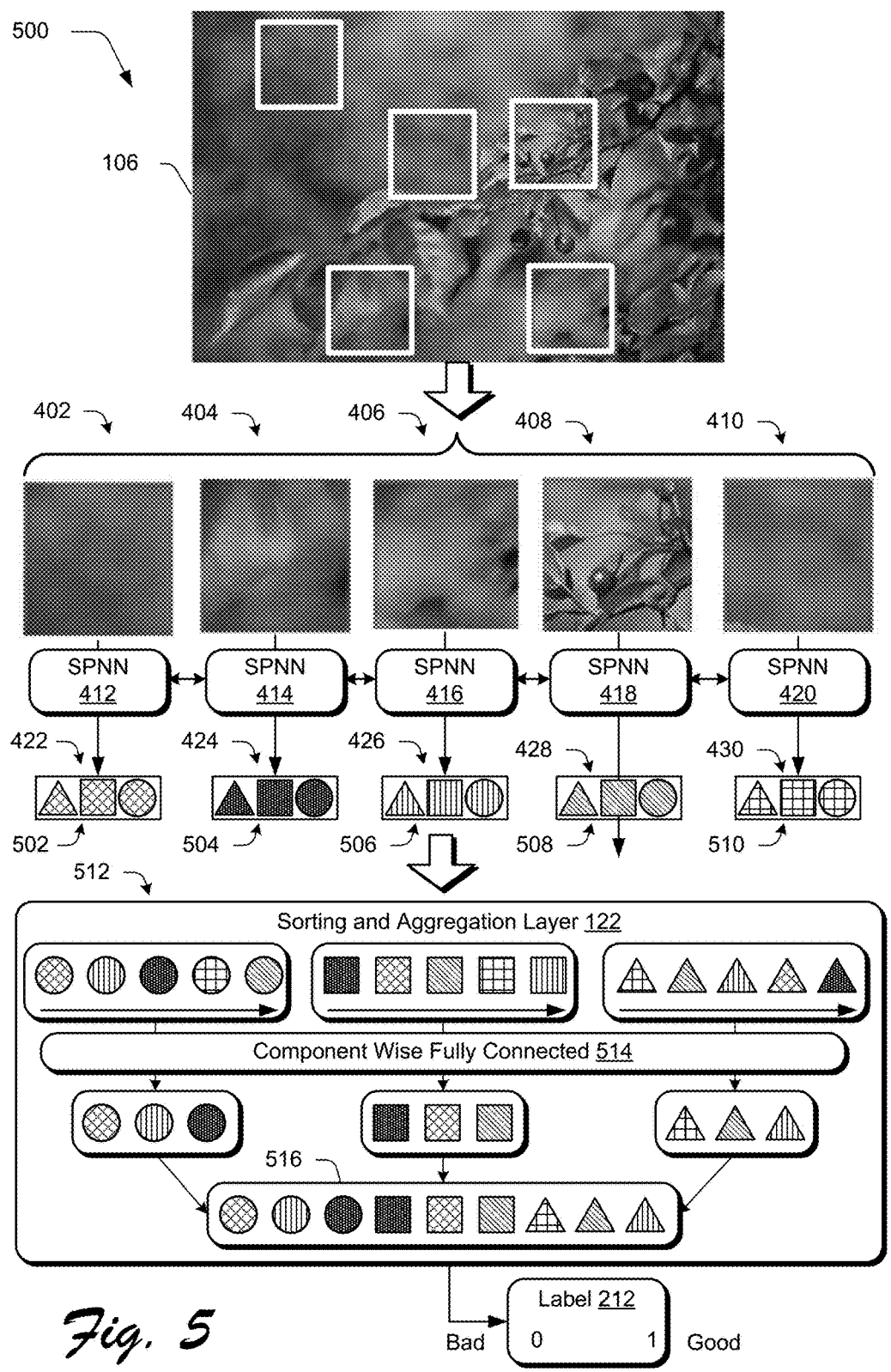
FIG. 5 depicts an example implementation of a constrained patch-group aggregation network that includes the single patch neural network of FIG. 3.

FIG. 4 depicts an example implementation 400 of a patch-group aggregation network that includes the single patch neural network 302 of FIG. 3. In this example, a plurality of patches 402, 404, 460, 408, 410 are randomly cropped from a single image 106. The patches 402-410 are then taken as inputs to a shared single-column patch neural network in which each of the columns includes a SPNN 412, 414, 416, 418, 420 that processes a corresponding patch 402-410 during forward propagation.

Individual patch outputs of the SPNN 412-420 are configured as respective vectors 422, 424, 426, 428, 430. Each of the vectors 422-430 is multidimensional as previously described and thus the output includes activations for those dimensions 432, 434, 436, 438, 440, e.g., for respective image characteristics.

This output may then be processed by the patch sorting and aggregation layer 112, such as for each dimension of the individual patch outputs, i.e., the dimensions 432-440 of the vectors 422-430. For example, the sorting and aggregation layer may rank activations for the dimensions and thus the image characteristic. In the illustrated example, a single dimension 442 is illustrated using shapes as included within the patch sorting and aggregation layer 112, but as should be readily apparent this may be performed to sort for a plurality of dimensions 444 of the vectors. The sorted output for the plurality of dimensions 444 is then concatenated 446 as a long vector and a patch aggregation weight is learned using a fully connected layer 448, which is then used to label 212 the image.

During sorting, the order of each individual outputs from the SPNN 412-420 is recorded. During back propagation through the neural network, a corresponding gradient descent is assigned to at least one of the patches 402-410 based on the recorded order. Errors produced by the patches 402-410 in the patch group contribute to the learning process. Further, the weights in layers of SPNN 412-420 are shared among each of patches, as illustrated by the connecting arrows between the SPNN 412-420 in the figure. With shared weights, individual patch outputs are of the same scale and the network structure is not increased in the SPNN layers in this example. A label 212 may then be applied to the image 106, such as to indicate a confidence of the image 106 having an image attribute, e.g., "good" or "bad" aesthetics as previously described.

FIG. 5 depicts an example implementation 500 of a constrained patch-group aggregation network that includes the single patch neural network 302 of FIG. 3. As before, a plurality of patches 402, 404, 460, 408, 410 are randomly cropped from a single image 106. The patches 402-410 are then taken as inputs to a shared single-column patch neural network in which each of the columns includes a SPNN 412, 414, 416, 418, 420 that processes a corresponding patch 402-410 during forward propagation.

Individual patch outputs of the SPNN 412-420 are configured as respective vectors 422, 424, 426, 428, 430 are shown. Each of the vectors 422-430 is multidimensional as previously described and thus in this example multiple dimensions 502, 504, 506, 508, 510, each of the dimensions represented as having a corresponding shape in the figure and are illustrated as having a corresponding fill to indicate correspondence with a respective patch 512.

The sorting and aggregation layer 122 is illustrated as having sorted and ranked the dimensions 502-510 of the vectors 422-430. This implementation provides an alternative to the implementation of FIG. 4. The difference between lies in a component wise fully-connected layer 514 following a sorting layer, an output of which is then concatenated 516. Specifically, implementation 400 applies a fully-connected layer to each dimension of individual patch outputs, whereas implementation 500 applies the fully-connected layer 512 to each of the dimensions of individual patch outputs (e.g., vectors 422-430) as a whole. Compared with implementation 400, implementation 500 reduces the degree of freedom in learning the aggregation weights to arrive at a result 514, e.g., a label for the image 106 as before.

For example, if after sorting, the output of the sorting layer is $x=(a\_1, a\_2, \ldots, a\_n, b\_1, b\_2, \ldots b\_n, \ldots)$, where $a, b, \ldots$ denote dimensions, and the neurons in the fully connected layer are represented as $y=(A\_1, A\_2, \ldots, A\_m, B\_1, B\_2, B\_m, \ldots)$, then in the structure in FIG. 4, there is a connection between each element in x and y, regardless of the dimension, In the constrained example in FIG. 5, however, there are only connections between $(a\_1, a\_2, \ldots, a\_n)$ and $(A\_1, A\_2, \ldots, A\_m)$, between $(b\_1, b\_2, \ldots b\_n)$ and $(B\_1, B\_2, B\_m)$, and so on. The outputs $(A\_1, A\_2, \ldots A\_m), (B\_1, B\_2, B\_m), \ldots$ are then concatenated 516 as a long vector, which may be used in labeling 212.

Thus, the implementations 400, 500 describe use of neural network using sorting and aggregation that may be applied to a variety of applications, such as to determine a confidence the image has an image attribute. Statistics may also be used for labeling, an example of which is described as follows and as shown in corresponding figures.

Figure 6:
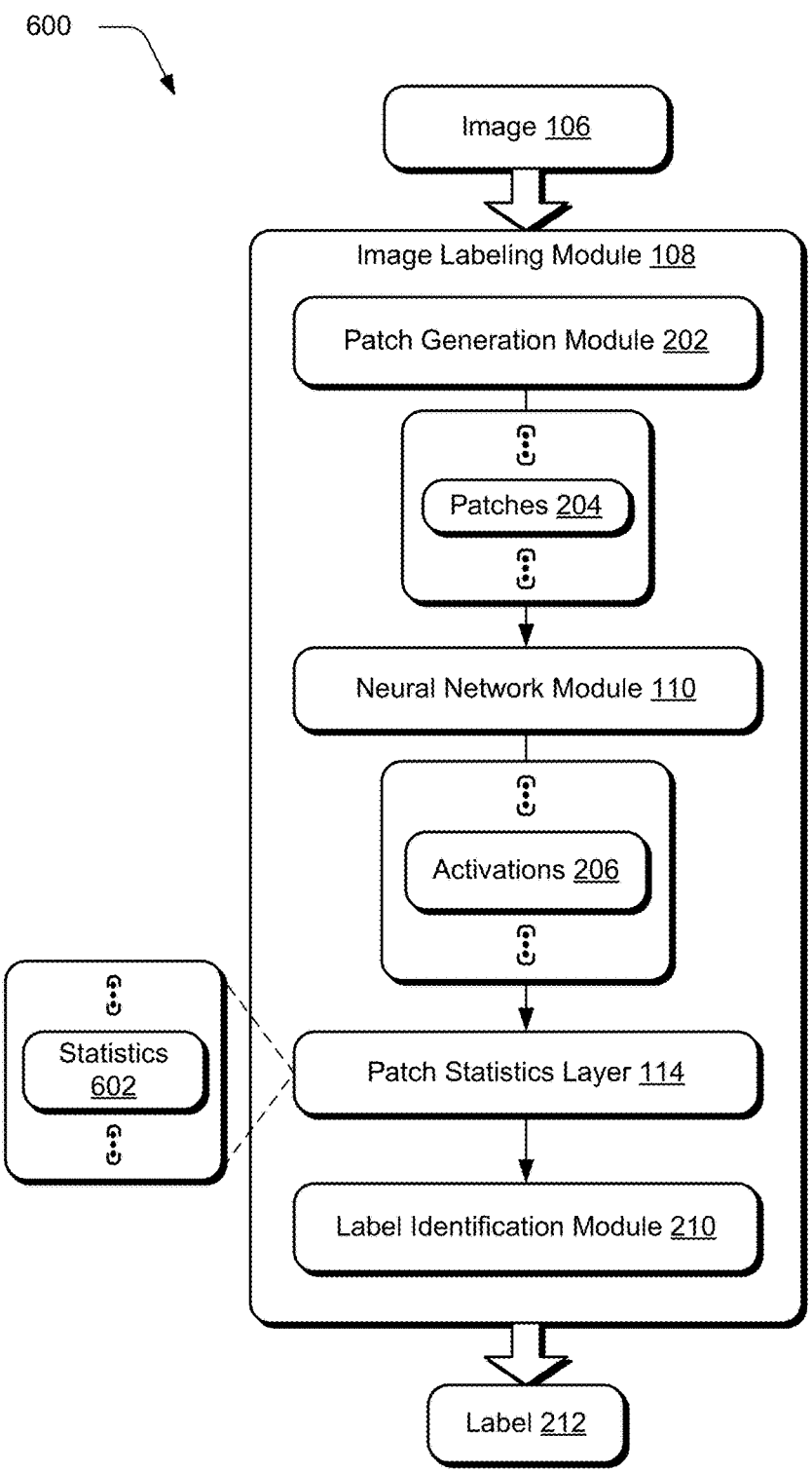
FIG. 6 depicts a system in an example implementation showing interaction of a neural network of the neural network module and a patch statistics layer to perform labeling.

FIG. 6 depicts a system 600 in an example implementation showing interaction of a neural network of the neural network module 110 and a patch statistics layer 114 to perform labeling. As before, the image labeling module 108 receives an image 106. A patch generation module 202 is then utilized to generate a plurality of patches 204 from the image 106. For example, the patches 204 may be randomly sampled from the image having a fixed size, e.g., 128, 196, 256, 320 pixel sizes and so forth, and may be taken from multiple scales. Additionally, these patches 204 may be sampled without down-sampling the image 106 by the patch generation module 202 and thus may be performed without loss of information.

The patches 204 are then used to train a neural network of the neural network module 110. The neural network module 110, for instance, may be configured to calculate activations of image characteristics for each of the patches. As previously described, the image characteristics may describe a variety of different characteristics, such as noise, darkness, contrast, structure, whether an alignment is upright likelihood of including a part of an object (e.g., face), and so forth.

These activations 206 may be expressed in a variety of ways. For example, for each of the patches 204, a vector having a plurality of dimensions may be generated in which each of the dimensions have a corresponding image characteristic. Thus, the vector may express an amount of each of the respective characteristics through use of the activations using the dimensions of the vector as previously described.

In this example, the image labeling module 108 includes the patch statistics layer 114, which may be utilized to generate statistics 602 regarding the activations of the dimensions in the vector, e.g., for particular image characteristics. The power of patch statistics has been demonstrated in image restoration problems, such as image denoising, image de-blurring, and image super resolution. In these problems, however, the patch size is small, ranging from 55 to 1717 pixels. In the case of small patches, the dimension of training samples is low, so simple non-linear functions may be learned to capture those statistical information.

However, in case of high-level classification problems, such as image aesthetics, image style classification, and image quality classification, larger patches may be taken as inputs, e.g., 128×128 in three color channels, 256×256 in three color channels, and so forth. As images 106 may not be consistent in terms of quality, aesthetics, and style throughout the image, patch statistics may be used to improve the classification performance of these problems, which may be used by a label identification module 210 to generate a label for the image 106 as previously described. An example of a neural network that incorporates the patch statistics layer 114 is described in the following and is shown in a corresponding figure.

Figure 7:
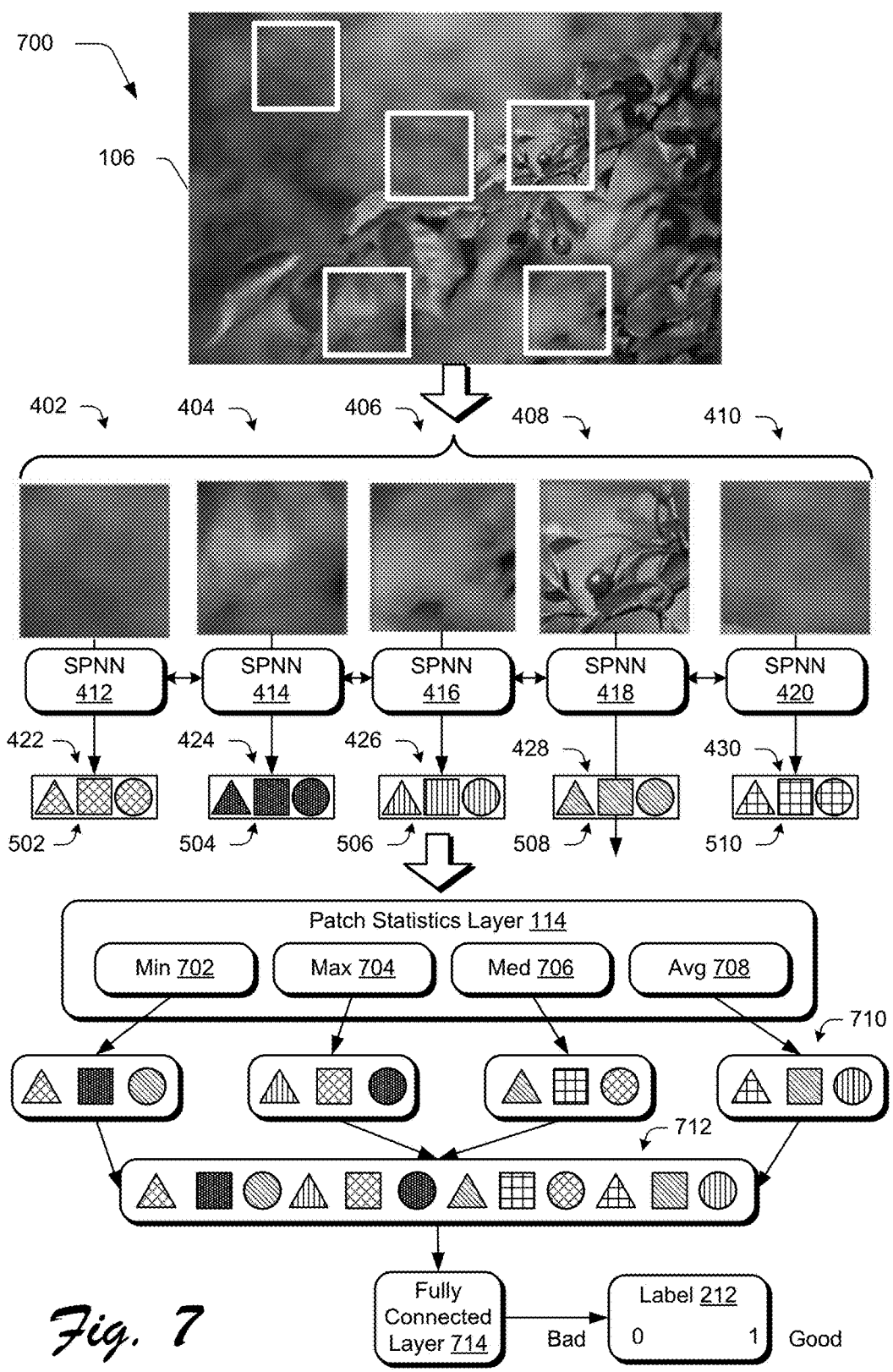
FIG. 7 depicts an example implementation of a neural network as employing a patch statistics layer as part of image labeling.

FIG. 7 depicts an example implementation 700 of a neural network as employing a patch statistics layer 114 as part of image labeling. As before, a plurality of patches 402, 404, 460, 408, 410 are randomly cropped from a single image 106. The patches 402-410 are then taken as inputs to a shared single-column patch neural network in which each of the columns includes a SPNN 412, 414, 416, 418, 420 that processes a corresponding patch 402-410 during forward propagation.

Individual patch outputs of the SPNN 412-420 are configured as respective vectors 422, 424, 426, 428, 430 are shown. Each of the vectors 422-430 is multidimensional as previously described and thus in this example multiple dimensions 502, 504, 506, 508, 510, each of the dimensions represented as having a corresponding shape in the figure and are illustrated as having a corresponding fill to indicate correspondence with a respective patch 512.

This output may then be processed by the patch statistics layer 114. Deep convolutional neural network has been demonstrated as an effective approach for hierarchically capturing spatial information from high-dimensional input, such as an image of 256×256 for three color channels. In this example, the learning process of a deep convolutional neural network is incorporated with patch statistics. For example, dimensions of individual patches may be reduced through the neural networks to produce lower-dimensional feature vectors that are then used to compute the patch statistics 602 by the patch statistics layer 114.

In one or more implementations, this is not a two-step process, but rather is implemented using an iterative network training framework, where the error generated based on patch statistics contributes to neural network training. As before, this may be applied to achieve a variety of different results, such as to calculate image aesthetics, image quality, and image style classification.

In this example, the patch statistics layer 114 generates a plurality of different statistics 602, examples of which include a minimum 702, maximum 708, median 706, and average 708 of the activations for the image characteristics. The output vectors 710 are concatenated 712 and fully-connected layers 714 of the neural network are trained for classification using those patch statistics, e.g., to compute a label 212. During back propagation, errors generated by patch statistics are back propagated to each individual patches and those errors in a whole contribute to the neural network training. In this way, the statistics that are computed based on activations of image characteristics expressed in a vector may also be used to label an image. Further discussion of these and other examples may be found in relation to the following procedures.

Example Procedures

The following discussion describes neural network techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
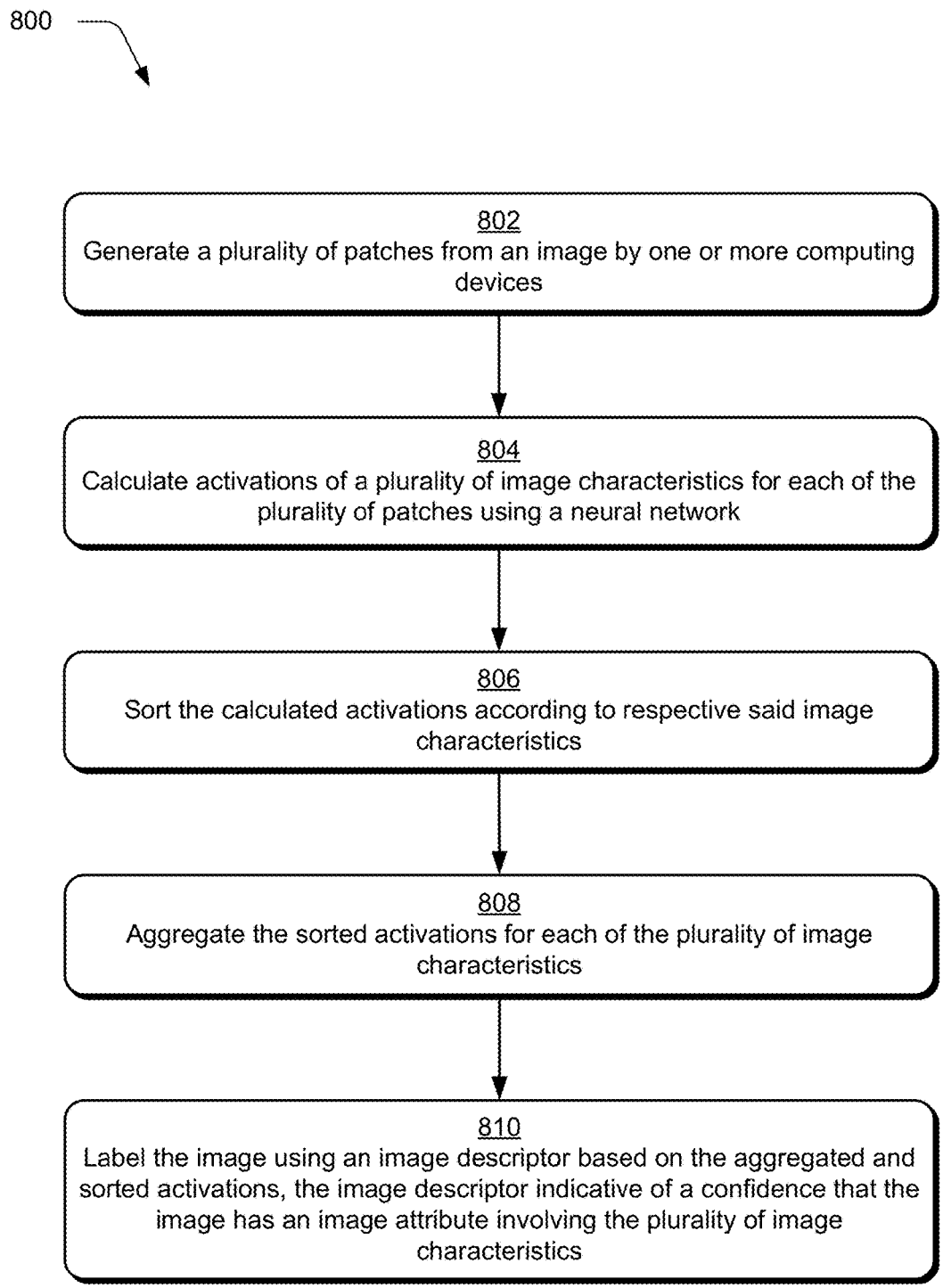
FIG. 8 is a flow diagram depicting a procedure in an example implementation in which sorting and aggregation techniques are employed as a layer of a neural network to label an image.

FIG. 8 depicts a procedure 800 in an example implementation in which sorting and aggregation techniques are employed as a layer of a neural network to label an image. A plurality of patches are generated from an image by one or more computing devices (block 802). A patch generation module 202, for instance, may be utilized to generate patches 204 of a fixed size from an image 106 that are selected in a random manner, which may be performed at different scales.

Activations are calculated of a plurality of image characteristics for each of the plurality of patches using a neural network (block 804). A neural network module 110, for instance, may implement a neural network having a plurality of columns in which each column is utilized to process a respective patch. An output may be configured as a multi-dimensional vector in which each dimension corresponds to a respective image characteristic.

The calculated activations are sorted according to respective said image characteristics (block 806). Continuing with the previous example, activations in respective dimensions of the vectors may be sorted. The sorted activations are aggregated for each of the plurality of image characteristics (block 808). A variety of different aggregation techniques may be employed, such as a ranking to calculate fixed weights for the activations that are then used in the aggregation.

The image is labeled using an image descriptor based on the aggregated and sorted activations, the image descriptor indicative of a confidence that the image has an image attribute involving the plurality of image characteristics (block 810). The image descriptor, for instance, may be utilized to determine face quality classification, image quality classification, or image aesthetics using image characteristics processed by the neural networks.

Figure 9:
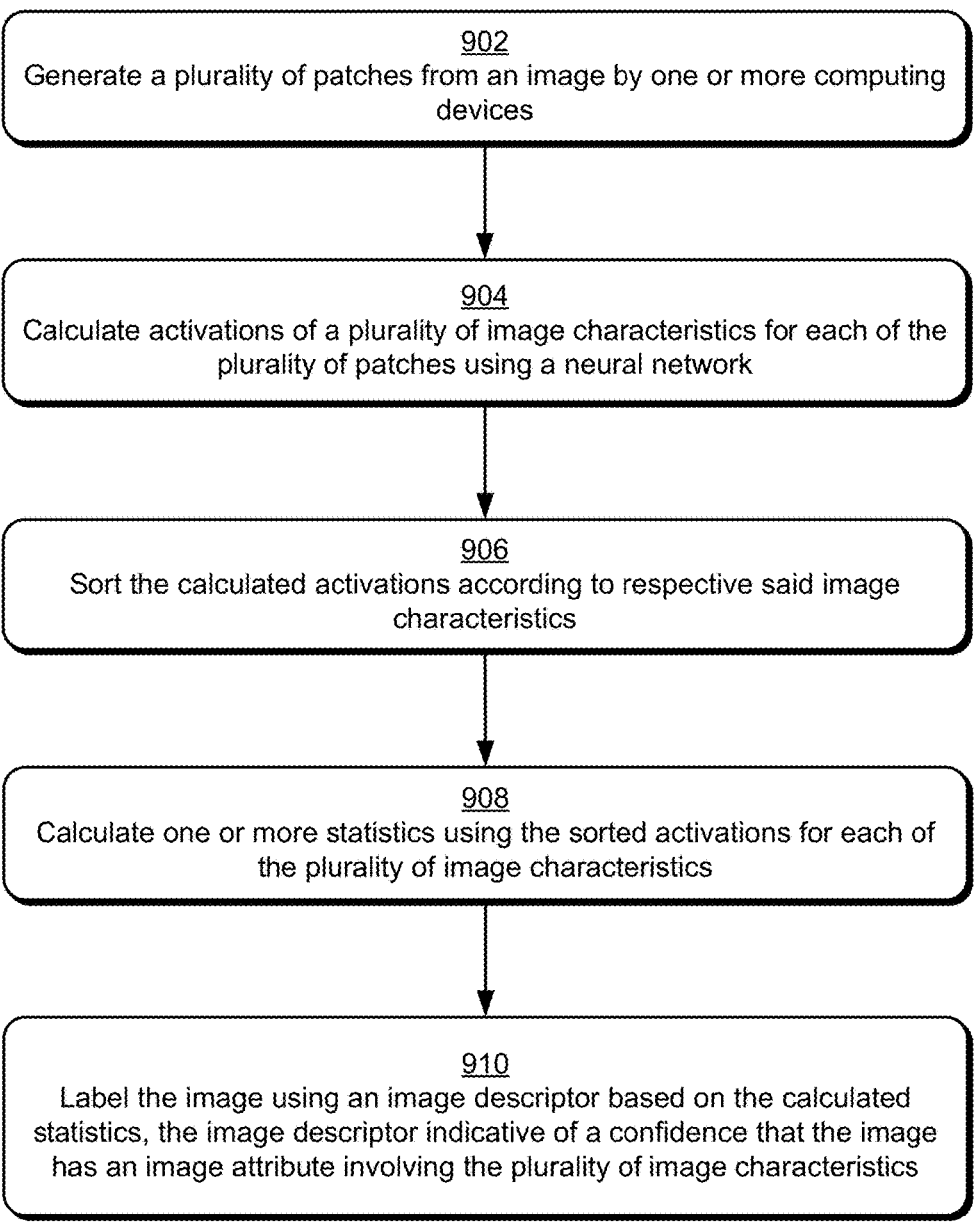
FIG. 9 is a flow diagram depicting a procedure in an example implementation in which statistical techniques are employed as a layer of a neural network to label an image.

FIG. 9 depicts a procedure 900 in an example implementation in which statistic techniques are employed as a layer of a neural network to label an image. A plurality of patches are generated from an image by one or more computing devices (block 902). Activations are then calculated of a plurality of image characteristics for each of the plurality of patches using a neural network (block 904). The calculated activations are sorted according to respective said image characteristics (block 906). As previously described, for instance, patches may be randomly sampled and processed by an image processing module to generate a vector having dimensions corresponding to a plurality of different image characteristics.

One or more statistics are calculated using the sorted activations for each of the plurality of image characteristics (block 908). Activations in the dimensions in the vector, for instance, may be used to calculate statistics such as a minimum 702, maximum 704, median 706, average 708, and so forth.

The image is labeled using an image descriptor based on the calculated statistics, the image descriptor indicative of a confidence that the image has an image attribute involving the plurality of image characteristics (block 910). As above, the image attribute may be determined based on these statistics, such as to express a confidence that the image 106 is has "good" or "bad" image aesthetics, image quality, facial quality, and so forth and may do so automatically and without user intervention.

Example System and Device

Figure 10:
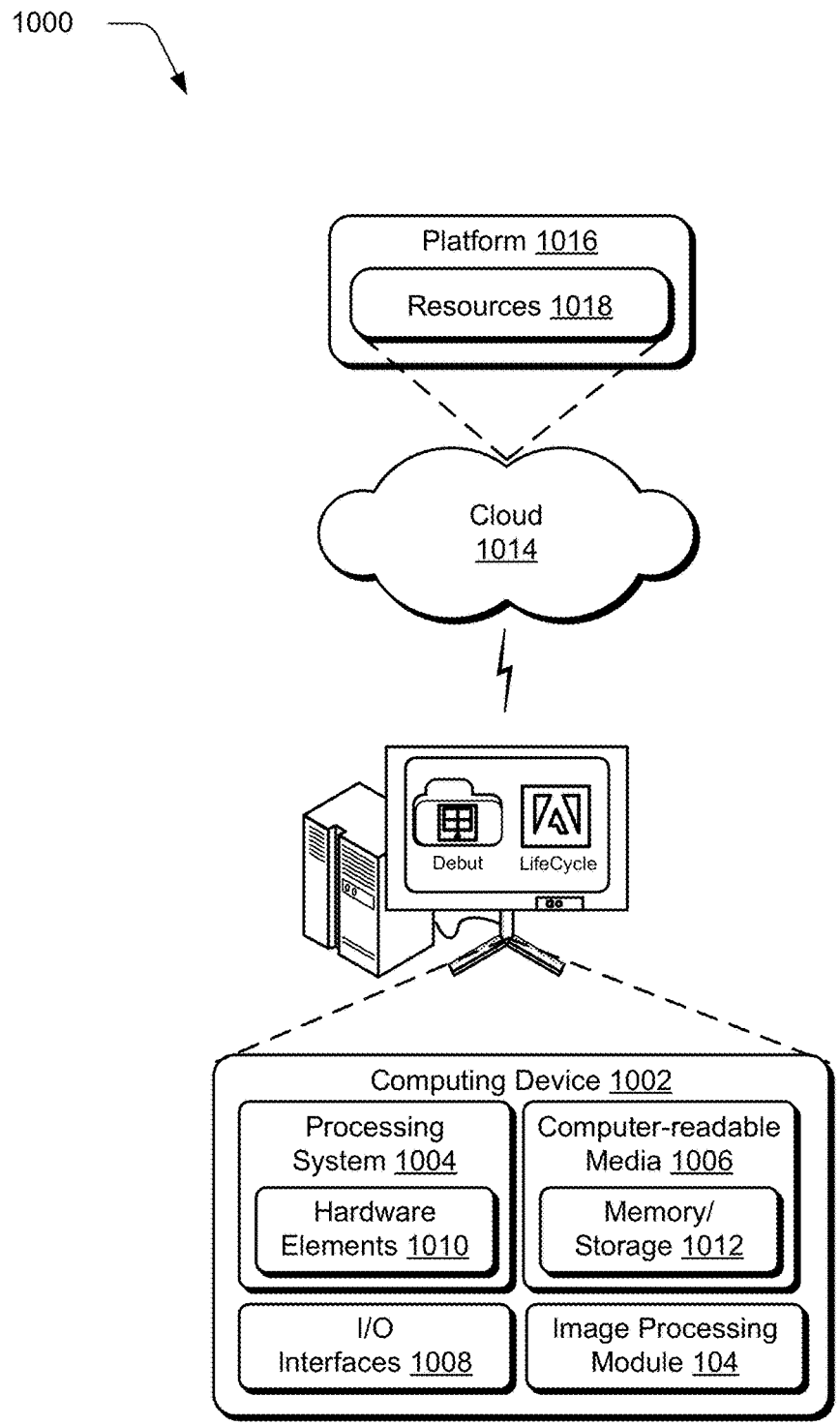
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the image processing module 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
generating a plurality of patches from an image by one or more computing devices;
calculating activations of a plurality of image characteristics for each of the plurality of patches using a neural network;
sorting the calculated activations according to respective said image characteristics by the one or more computing devices, wherein the sorting includes learning fixed weights for respective said patches;
aggregating the sorted activations for each of the plurality of image characteristics by the one or more computing devices, wherein the aggregating is performed using the fixed weights; and
labeling the image using an image descriptor based on the aggregated and sorted activations by the one or more computing devices, the image descriptor indicative of a confidence that the image has an image attribute involving the plurality of image characteristics.

2. A method as described in claim 1, wherein the generating is performed such that the plurality of patches are selected randomly from the image in an order-less manner.

3. A method as described in claim 1, wherein the plurality of patches are taken from the image without down-sampling the image.

4. A method as described in claim 1, wherein the aggregating includes ranking the calculated activations, one to another, for the image characteristic.

5. A method as described in claim 1, wherein;
The calculated activations for a respective said path are included in a vector that has a plurality of dimensions, each of the dimensions corresponding to respective said image characteristic; and
The sorting includes sorting the calculated activations on individual said dimensions of the plurality of vectors.

6. A method as described in claim 5, wherein the aggregating includes concatenating the sorted output of the calculated activations and the labeling is based on a patch aggregation weight learned from the concatenating.

7. A method as described in claim 6, wherein the patch aggregation weight is learned using a fully connected layer of the neural network, the sorting including recording an order of individual outputs of the calculated activations, back propagation is performed to assign a corresponding gradient descent to respective said patches based on the recorded order, and the patch aggregation weights are shared with other said patches as part of computation of the patch aggregation weights.

8. A method as described in claim 1, wherein the neural network is a single-column patch neural network (SPNN) that is configured to perform the calculating of the activations for each of the plurality of patches.

9. A method as described in claim 1, wherein the image attribute involves face quality classification, image quality classification, or image aesthetics.

10. A method comprising:
generating a plurality of patches from an image by one or more computing devices;
calculating activations of a plurality of image characteristics for each of the plurality of patches using a neural network;
sorting the calculated activations according to respective said image characteristics by the one or more computing devices, wherein the sorting includes learning fixed weights for respective said patches;
calculating one or more statistics using the sorted activations for each of the plurality of image characteristics by the one or more computing devices; and
labeling the image by the one or more computing devices using an image descriptor based on the calculated statistics, the image descriptor indicative of a confidence that the image has an image attribute involving the plurality of image characteristics.

11. A method as described in claim 10, wherein the statistics include a minimum, maximum, median, or average of the calculated activations.

12. A method as described in claim 10, wherein the calculating of the statistics is performed as part of an iterative network training framework in which an error generated based on the one or more statistics contributes to training of the neural network.

13. A method as described in claim 10, wherein the generating is performed such that the plurality of patches are selected randomly from the image in an order-less manner.

14. A method as described in claim 10, further comprising concatenating output vectors that included the calculated activations and training fully-connected layers of the neural network for classification using the calculated statistics as part of the labeling.

15. A system comprising:
a patch generation module implemented at least partially in hardware, the patch generation module configured to generate a plurality of patches through random selection from an image;
a neural network module implemented at least partially in hardware, the neural network module configured to generate a vector using a neural network for each of the plurality of patches having activations in dimensions corresponding to respective ones of a plurality of image characteristics, wherein the calculated activations for a respective said patch are included in a vector that has a plurality of dimensions, each of the dimensions corresponding to respective said image characteristic;
a sorting and aggregation module implemented at least partially in hardware, the sorting and aggregation module configured to sort the calculated activations according to respective said image characteristics and aggregate the sorted activations for each of the plurality of image characteristics, wherein the sorting includes sorting the calculated activations on individual said dimensions of the plurality of vectors; and
a labelling module implemented at least partially in hardware, the labeling module configured to label the image using an image descriptor based on the aggregated and sorted activations, the image descriptor indicative of a confidence that the image has an image attribute involving the plurality of image characteristics.

16. A system as described in claim 15, wherein the sorting includes learning fixed weights for respective said patches and the aggregating is performed using the fixed weights.

17. A system as described in claim 15, wherein the aggregating includes concatenating the sorted output of the calculated activations and the labeling is based on a patch aggregation weight learned from the concatenating.

18. A system as described in claim 17, wherein the patch aggregation weight is learned using a fully connected layer of the neural network, the sorting including recording an order of individual outputs of the calculated activations, back propagation is performed to assign a corresponding gradient descent to respective said patches based on the recorded order, and the patch aggregation weights are shared with other said patches as part of computation of the patch aggregation weights.

19. A method comprising:
generating a plurality of patches from an image by one or more computing devices, wherein the plurality of patches are taken from the image without down-sampling the image;
calculating activations of a plurality of image characteristics for each of the plurality of patches using a neural network;
sorting the calculated activations according to respective said image characteristics by the one or more computing devices;
aggregating the sorted activations for each of the plurality of image characteristics by the one or more computing devices; and
labeling the image using an image descriptor based on the aggregated and sorted activations by the one or more computing devices, the image descriptor indicative of a confidence that the image has an image attribute involving the plurality of image characteristics.

20. A method comprising:
generating a plurality of patches from an image by one or more computing devices;
calculating activations of a plurality of image characteristics for each of the plurality of patches using a neural network;
sorting the calculated activations according to respective said image characteristics by the one or more computing devices;
aggregating the sorted activations for each of the plurality of image characteristics by the one or more computing devices, wherein the aggregating includes ranking the calculated activations, one to another, for the image characteristic; and
labeling the image using an image descriptor based on the aggregated and sorted activations by the one or more computing devices, the image descriptor indicative of a confidence that the image has an image attribute involving the plurality of image characteristics.

21. A method comprising:
generating a plurality of patches from an image by one or more computing devices;
calculating activations of a plurality of image characteristics for each of the plurality of patches using a neural network, wherein the calculated activations for a respective said path are included in a vector that has a plurality of dimensions, each of the dimensions corresponding to respective said image characteristic;
sorting the calculated activations according to respective said image characteristics by the one or more computing devices, wherein the sorting the calculated activations on individual said dimensions of the plurality of vectors;
aggregating the sorted activations for each of the plurality of image characteristics by the one or more computing devices, wherein the aggregating includes concatenating the sorted output of the calculated activations and the labeling is based on a patch aggregation weight learned from the concatenating, and wherein the patch aggregation weight is learned using a fully connected layer of the neural network, the sorting including recording an order of individual outputs of the calculated activations, back propagation is performed to assign a corresponding gradient descent to respective said patches based on the recorded order, and the patch aggregation weights are shared with other said patches as part of computation of the patch aggregation weights; and
labeling the image using an image descriptor based on the aggregated and sorted activations by the one or more computing devices, the image descriptor indicative of a confidence that the image has an image attribute involving the plurality of image characteristics.

22. A method comprising:
generating a plurality of patches from an image by one or more computing devices;
calculating activations of a plurality of image characteristics for each of the plurality of patches using a neural network, wherein the neural network is a single-column patch neural network (SPNN) that is configured to perform the calculating of the activations for each of the plurality of patches;
sorting the calculated activations according to respective said image characteristics by the one or more computing devices;
aggregating the sorted activations for each of the plurality of image characteristics by the one or more computing devices; and
labeling the image using an image descriptor based on the aggregated and sorted activations by the one or more computing devices, the image descriptor indicative of a confidence that the image has an image attribute involving the plurality of image characteristics.

23. A method comprising:
generating a plurality of patches from an image by one or more computing devices;
calculating activations of a plurality of image characteristics for each of the plurality of patches using a neural network;
sorting the calculated activations according to respective said image characteristics by the one or more computing devices;
calculating one or more statistics using the sorted activations for each of the plurality of image characteristics by the one or more computing devices, wherein the calculating of the statistics is performed as part of an iterative network training framework in which an error generated based on the one or more statistics contributes to training of the neural network; and
labeling the image by the one or more computing devices using an image descriptor based on the calculated statistics, the image descriptor indicative of a confidence that the image has an image attribute involving the plurality of image characteristics.

24. A method comprising:
generating a plurality of patches from an image by one or more computing devices;
calculating activations of a plurality of image characteristics for each of the plurality of patches using a neural network;
sorting the calculated activations according to respective said image characteristics by the one or more computing devices;
calculating one or more statistics using the sorted activations for each of the plurality of image characteristics by the one or more computing devices, wherein further comprising concatenating output vectors that include the calculated activations and training fully-connected layers of the neural network for classification using the calculated statistics as part of the labeling; and
labeling the image by the one or more computing devices using an image descriptor based on the calculated statistics, the image descriptor indicative of a confidence that the image has an image attribute involving the plurality of image characteristics.

25. A system comprising:
a patch generation module implemented at least partially in hardware, the patch generation module configured to generate a plurality of patches through random selection from an image;
a neural network module implemented at least partially in hardware, the neural network module configured to generate a vector using a neural network for each of the plurality of patches having activations in dimensions corresponding to respective ones of a plurality of image characteristics;
a sorting and aggregation module implemented at least partially in hardware, the sorting and aggregation module configured to sort the calculated activations according to respective said image characteristics and aggregate the sorted activations for each of the plurality of image characteristics, wherein the sorting includes learning fixed weights for respective said patches and the aggregating is performed using the fixed weights; and a labelling module implemented at least partially in hardware, the labeling module configured to label the image using an image descriptor based on the aggregated and sorted activations, the image descriptor indicative of a confidence that the image has an image attribute involving the plurality of image characteristics.

* * * * *